United States Patent [19]

Windsor-Smith et al.

[11] Patent Number: 4,464,947
[45] Date of Patent: Aug. 14, 1984

[54] DRIVE TRANSMISSIONS

[76] Inventors: Claude P. Windsor-Smith, 33 Main St., Ashley, Nr. Market Harborough, Leicestershire; Raymond A. Tailby, 40 Moat Rd., Loughborough, Leicestershire, both of England

[21] Appl. No.: 262,360

[22] Filed: May 11, 1981

[30] Foreign Application Priority Data

May 30, 1980 [GB] United Kingdom ............... 8017755

[51] Int. Cl.³ .............................................. F16H 3/08
[52] U.S. Cl. ..................................... 74/329; 74/331;
74/333; 74/356; 74/357; 192/0.075; 192/48.8;
192/87.11; 192/4 A
[58] Field of Search ............... 74/329, 331, 333, 356,
74/357, 359, 360; 192/113 B, 0.075, 0.07, 0.096,
48.8, 4 A, 87.11, 87.1

[56] References Cited

U.S. PATENT DOCUMENTS

| | | | |
|---|---|---|---|
| 2,553,376 | 5/1951 | Le Tourneau | 74/360 |
| 2,633,754 | 4/1953 | Gerst | 74/360 |
| 3,064,448 | 11/1962 | Lee et al. | 74/360 |
| 3,498,150 | 3/1970 | Funk | 74/331 |
| 3,651,904 | 3/1972 | Snoy et al. | 192/113 B |

FOREIGN PATENT DOCUMENTS

| | | |
|---|---|---|
| 2842943 | 4/1980 | Fed. Rep. of Germany . |
| 1043561 | 11/1953 | France . |
| 1181589 | 6/1959 | France ................................. 74/359 |
| 231104 | 3/1925 | United Kingdom . |
| 1045834 | 10/1966 | United Kingdom . |
| 1459886 | 12/1976 | United Kingdom . |

*Primary Examiner*—Allan D. Herrmann
*Assistant Examiner*—D. Wright
*Attorney, Agent, or Firm*—Pollock, Vande Sande & Priddy

[57] ABSTRACT

An automatic transmission for a city bus and other highway vehicles comprises an engine-mounted gearbox with a laterally offset drive output to the rear wheels through a propeller shaft and differential drive unit. The gear box has four layshafts grouped round the drive input shaft. Multiplate pneumatic clutches, one on each layshaft, select transmission ratios under the control of a driver's selector switch acting through an electronic control unit and an electro-pneumatic valve supplied with air by a compressor. The control unit includes a retarder function provided by simultaneous partial engagement of the first and second gear clutches when the vehicle is in third or fourth gear. Access to the clutches for servicing is provided by end covers on the gearbox whereby the clutch elements can be replaced without stripping the gearbox.

17 Claims, 16 Drawing Figures

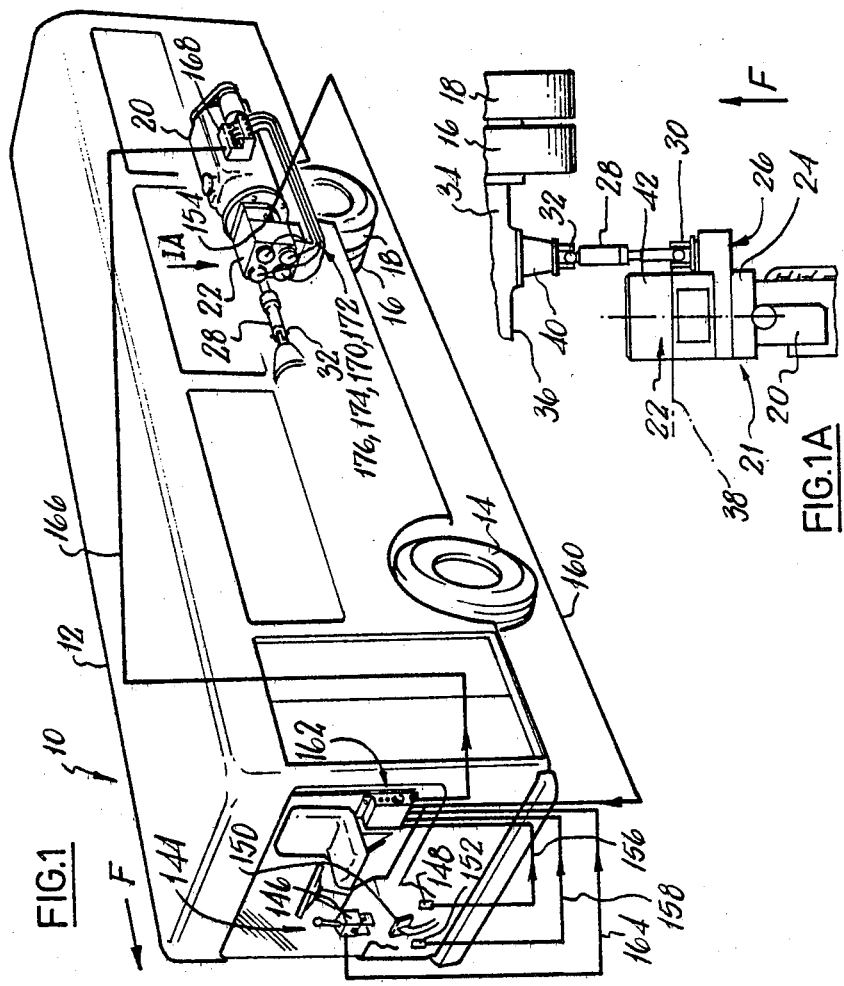

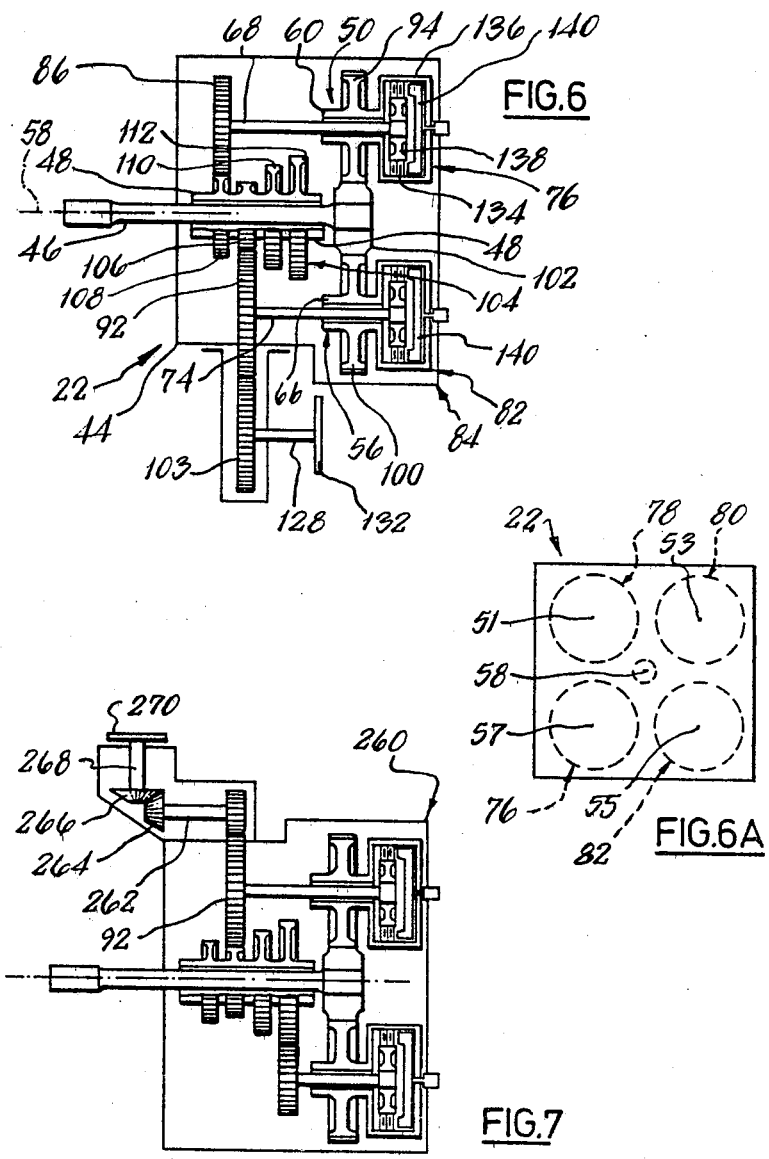

DRIVE TRANSMISSIONS

BACKGROUND OF THE INVENTION

This invention relates to change speed gear trains and to drive transmissions incorporating such gear trains, and to highway vehicles incorporating such drive transmissions.

The expression "highway vehicles" as used in this specification and claims, means a vehicle, such as a city bus or coach for transporting passengers, and/or a chassis for such a vehicle, which is intended for use primarily on highways or roads and which has a gearbox providing at least three forward transmission ratios, and which is capable of sustained operation at the usual operating speeds of highway vehicles. The expression is intended to cover general purpose vehicles and vehicle chassis which fall within the above definition, but which by virtue of, for example, a four wheel drive, are also capable of operation over rough terrain.

Highway vehicles usually are provided with only one transmission ratio for travel in the reverse direction, and the present invention is not relevant to shuttle-type vehicles such as crawler dozers and tractor-type front end loaders and the like which occasionally travel on highways to and from their place of work. Such shuttle-type vehicles are often provided with transmissions having multiple forward and multiple reverse transmission ratios, and the design criteria applicable to such vehicles are completely different from those applicable to highway vehicles with which this invention is concerned. This is due to the total difference between these two types of vehicles so far as concerns operating conditions, and cost and space considerations, and passenger and safety factors, and servicing criteria.

More particularly, but not exclusively, this invention relates to city buses or coaches. By the expression "city bus" as used in this specification and claims is meant a passenger transport vehicle capable of carrying at least fifteen passengers.

The drive transmissions of many public service vehicles such as city buses currently in use comprise planetary or epicyclic gearboxes. Such gearboxes are complex, expensive and difficult to understand and service, but despite these disadvantages have been developed to a stage at which they provide smooth operation with automatic ratio changing facilities, and are now universally accepted and used.

Constant mesh multiple layshaft type gear trains are considerably simpler than planetary gear trains and many proposals have been made for their use in various types of machines including some proposals for their use in certain land vehicles. However, such gear trains have not been widely accepted for use in such vehicles, and in public service vehicles, such as buses, the planetary gear train is still universally used. Among the reasons for this limitation in the use of multiple layshaft gear trains is the fact that change speed gear trains for use in highway vehicles are subject to a demanding series of inter-related technical requirements which have hitherto remained inadequately satisfied. These requirements include the following:

Firstly, there is the question of size, complexity and cost. Many previous proposals for multiple layshaft gear trains have required the use of a gearbox having a size quite unacceptable for incorporation in the crampled engine compartment of modern highway vehicles. Moreover, even where a gearbox of modest proportions has been proposed, it has usually been the case that the layout of the gear train has been such that the provision of the necessary range of transmission ratios needed for highway vehicle use (for a bus this range is from about 4 to 1 for bottom gear to 1 to 1 for top gear) has not been possible. In such circumstances, modification of the gear train to achieve the necessary ratios would in most cases result in a significant increase in the size of the gearbox.

Secondly, there is the question of servicing and access to the wearing components of the gearbox. Previous proposals for multi-layshaft constant mesh gear trains have not provided sufficient attnetion to the need for adequate clutch service life in combination with easy access to the clutches for servicing purposes, without introducing unacceptable drag into the drive transmission. Previous proposals have in many cases taught the use of unlubricated external clutches, which would have quite unacceptable service life for highway vehicle use. Where internal clutches have been proposed, these have usually been subject to uncontrolled splash lubrication (whereby uncontrolled and unacceptably high drag results) and/or the clutches have been located so as to be relatively inaccessible for servicing purposes.

French Pat. No. 1,043,561 discloses a two-layshaft constant mesh gear train providing five transmission ratios (including a direct-drive top gear) by means of four dry external cone clutches positioned one at each end of each of the layshafts so as to achieve double usage of both of the layshafts. The arrangement of this patent, i.e., unlubricated external clutches and double usage of both layshafts, is subject to the significant disadvantages of inadequate clutch service life and inaccessibility of two of the clutches when the gear train is mounted adjacent a prime mover.

U.S. Pat. No. 3,064,488 likewise discloses a multi-layshaft constant mesh gear train with multiple intermeshing layshaft gears providing a large number of transmission ratios and complex torque input paths with multiple torque-transmitting mesh points. The teaching of this prior patent is subject to the above-mentioned disadvantages of unacceptable size and complexity. Moreover, the teaching is once again of double usage of each layshaft with half of the clutches relatively inaccessible at the wrong end of the gear train.

An object of the present invention is to provide a constant mesh change speed gear train offering improvements in relation to at least some of the requirements and technical problems identified above.

SUMMARY OF THE INVENTION

The invention provides a constant mesh change speed gear train comprising an input shaft, an output shaft, an input shaft gear on the input shaft, an output shaft gear on the output shaft, at least two layshafts having corresponding constant mesh layshaft gears, clutch means for each of the layshafts for selective transmission of drive through the layshaft, and a gearbox housing containing the gear train. The layshaft gears comprise layshaft change speed input gears and layshaft output gears with one layshaft input gear and one layshaft output gear for each layshaft. The layshaft input gear of each layshaft meshes directly with the input shaft gear, and the layshaft output gear of each layshaft meshes directly with the output shaft gear. One layshaft and its corresponding clutch means and layshaft gears are provided for each layshaft-transmitted transmission ratio between the input shaft gear and the output shaft gear. The clutch means are located within the gearbox housing at one end thereof and at the ends of the layshafts, the clutch means being accessible for servicing purposes by removable or openable cover means of the gearbox housing.

In an embodiment of the invention described below, the provision of an input shaft gear and an output shaft gear meshing directly with the corresponding input and output gears of each of the layshafts provides simplicity of construction and overall compactness while nevertheless allowing four transmission ratios offering the necessary range of ratios for highway vehicle usage to be provided. In the same embodiment, the provision of one layshaft and its corresponding clutch means for each layshaft-transmitted transmission ratio between the input shaft gear and the output shaft gear, thereby avoiding double usage of the layshafts, enables the clutch means to be located all at one end of the gearbox housing. This latter feature, with the clutch means located within such housing with access for servicing purposes by means of removable cover means, not only offers ease of servicing but also facilitates controlled lubrication (permitting control of drag and the use of the clutches for retardation purposes), and enables the gear train to be mounted directly against one end of an engine or drive coupling assembly without impairing access to the clutches.

Embodiments of the invention will now be described by way of example with reference to the accompanying drawings in which:

FIG. 1 is a perspective view of a city bus partly cut away to show an engine and a drive transmission, together with a control system and a diagrammatic representation of the circuit connecting the control system to the drive transmission;

FIG. 1A is a plan view of a portion of the engine and the drive transmission of FIG. 1, the direction of viewing being indicated by arrow IA therein;

FIG. 6 is a diagrammatic sectional view through a gearbox forming part of the transmissions of FIGS. 1, 2 and 5;

FIG. 7 shows, in a view similar to that of FIG. 6, the gearbox of FIG. 6 with a modified drive output arrangement incorporating bevel gears for use in the transmission of FIG. 3;

FIG. 6A is a diagrammatic rear end view of the gearbox of FIG. 6 showing the relative dispositions of four clutch means located within the gearbox housing, the direction of viewing being indicated by arrow VIA in FIG. 6;

Figure 3:
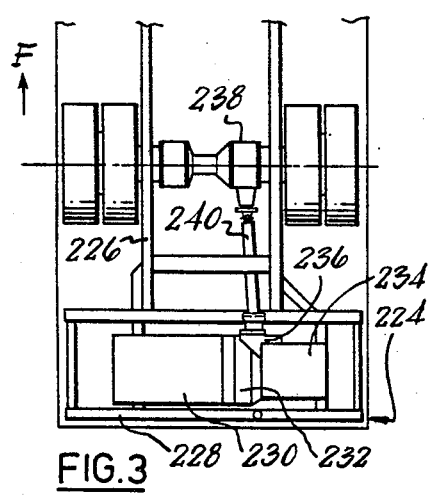
Figure 10:
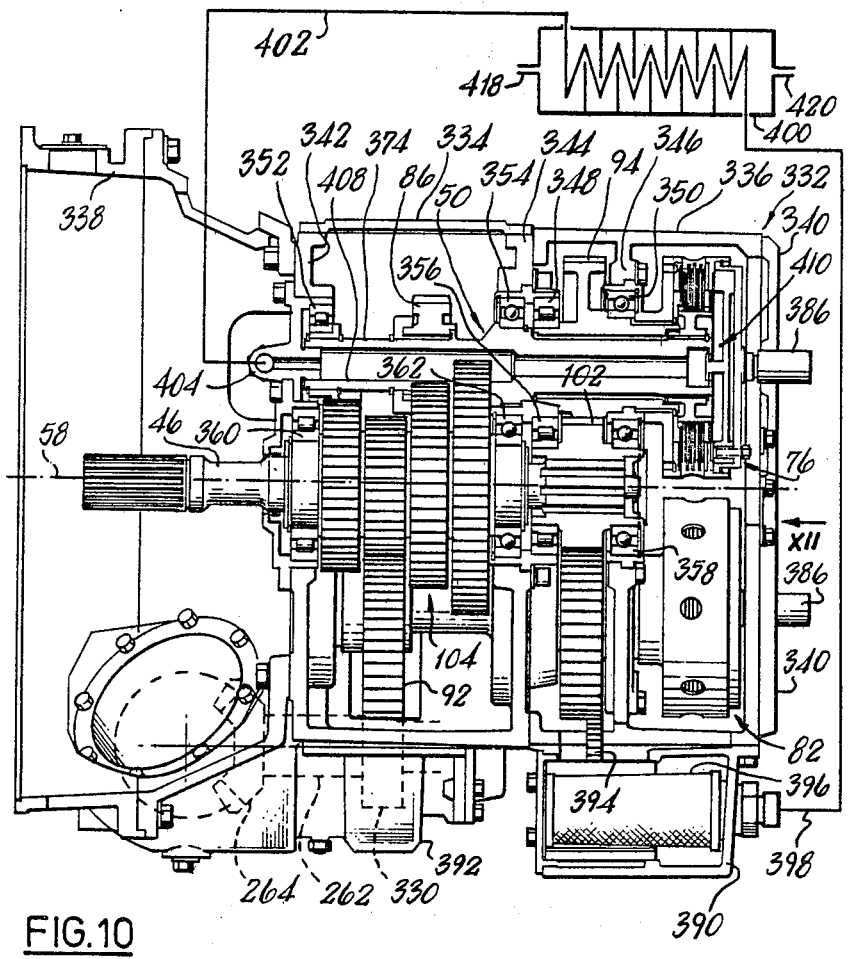
FIG. 10 shows a longitudinal sectional view through the gearbox of the transmissions of FIGS. 3 and 7. This Figure is a detailed assembly drawing corresponding to the gearbox of FIG. 7.
Figure 13:
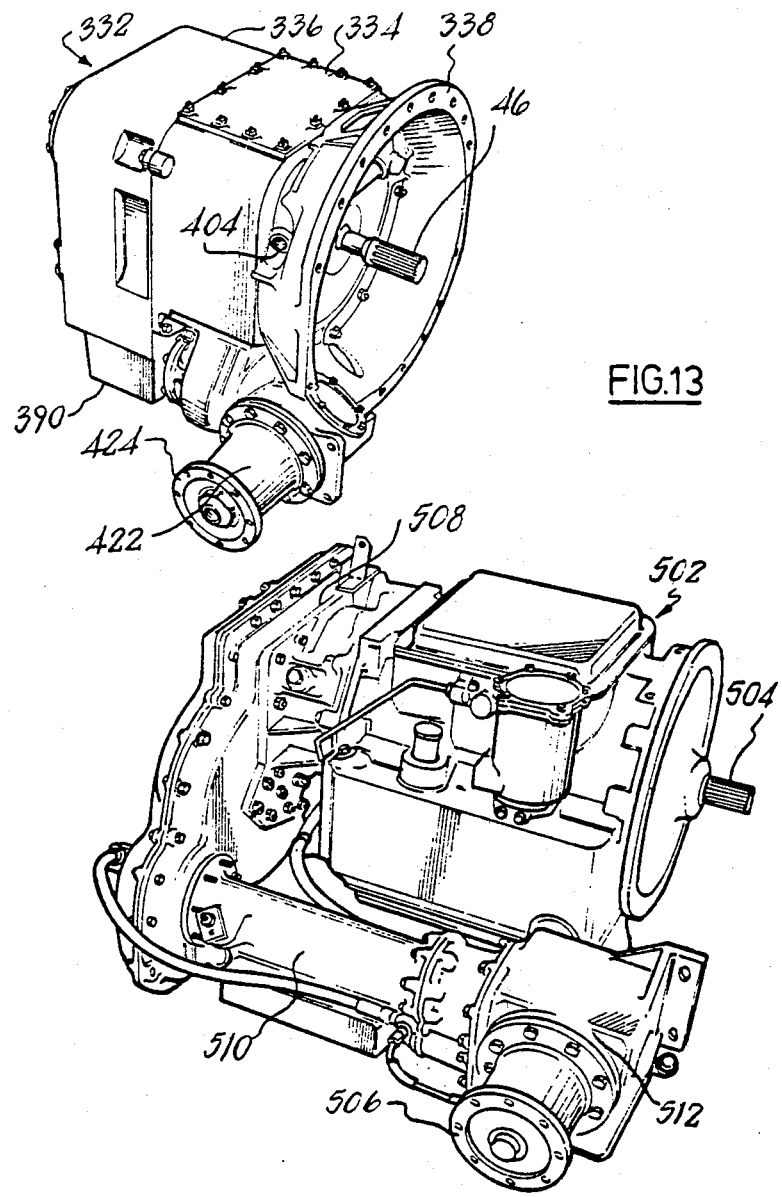
Figure 14:
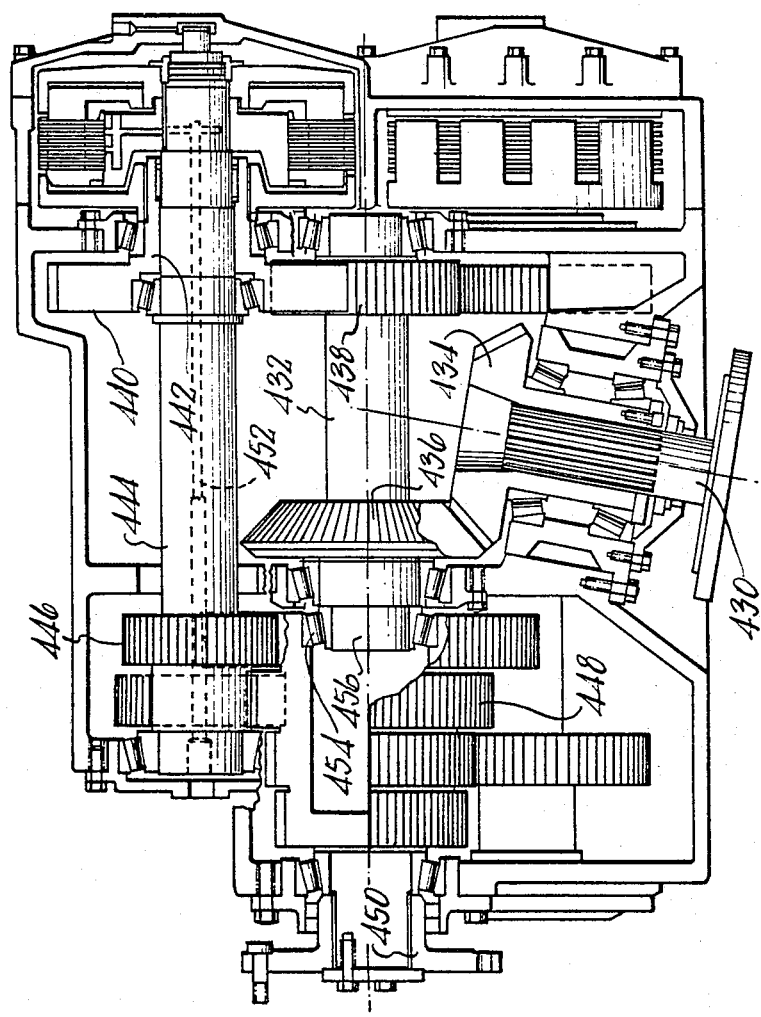

FIG. 13 shows perspective views of two gearboxes and their drive output assemblies for use in the city bus of FIG. 3. The gearbox on the left hand side is constructed in accordance with the invention whereas the gearbox at the right hand side is a conventional epicyclic gearbox having a rear end drive output and a special additional drive train to bring the drive output to the front end of the gearbox; and FIG. 14 is an assembly drawing similar to that of FIG. 10 showing a modification of the gearbox of FIG. 10 to accommodate an oblique angled side drive input.

DESCRIPTION OF THE PREFERRED EMBODIMENTS

As shown in FIG. 1 and FIG. 1A, a highway vehicle in the form of a city bus 10 comprises a bus body 12 mounted on front steerable single wheels 14 and dual driven rear wheels 16, 18. The bus of FIG. 1 does not include a chassis. Later described embodiments have chassis, and the invention as defined herein is applicable both to a city bus and to a bus chassis.

Bus 10 further comprises a prime mover in the form of a diesel internal combustion engine 20 and a drive transmission 21 for providing a variable ratio drive between engine 20 and driven wheels 16, 18. Transmission 21 comprises a gearbox 22, a fluid drive coupling in the form of a fluid flywheel 24 located between the engine and the gearbox to transmit drive therebetween, and a drive train 26 from the gearbox to the rear wheels 16, 18 comprising a propeller shaft 28, associated universal joints 30, 32 and a differential drive unit 34 mounted in the rear axle housing 36 between rear wheels 16 and 18.

Diesel engine 20 is mounted at the rear of bus 10 with respect to direction F of forward travel of the bus, with the crankshaft of the engine extending in direction F. The drive output connection of the gearbox, to which universal joint 30 is connected, is located rearwardly of the lateral center line 38 of the gearbox, and the propeller shaft 28 is connected to the rearwardly facing input connection 40 on differential drive unit 34 and extends alongside the front portion 42 of the gearbox.

Figure 8:
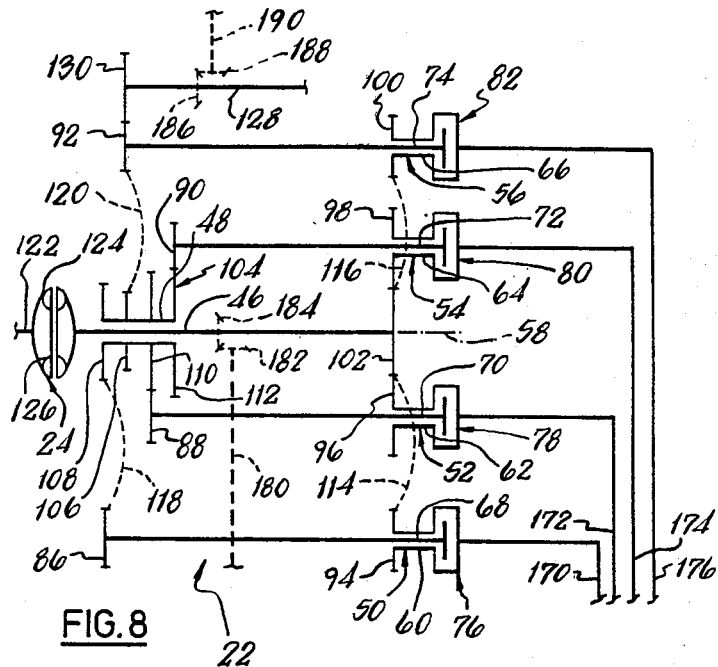
FIG. 8 is a diagrammatic representation of the gearboxes of FIGS. 6 and 7, and showing in dotted lines further possible modifications of the drive input arrangements. This Figure also shows a fluid flywheel drive input and pneumatic clutch control conduits for automatic gear shifting.

The structure and arrangement of the principal parts of gearbox 22 are shown diagrammatically in FIGS. 6 and 8 to illustrate the principles of the gearbox. FIG. 10 is a detailed assembly drawing of the gearbox.

As shown in FIGS. 6 and 8, gearbox 22 comprises a constant mesh change speed gear train contained in a housing 44, a drive input shaft 46 journalled in the housing for rotation and drivably coupled through fluid flywheel 24 to engine 20, and a drive output shaft 48 journalled in the housing for rotation in parallel and coaxial relationship to input shaft 46, and drivably coupled to drive train 26.

Four layshafts 50, 52, 54 and 56 are journalled in housing 44 for rotation about respective axes 51, 53, 55 and 57 which are parallel to and disposed around the axis 58 of the drive input and output shafts 46, 48. Each of the layshafts comprises its own outer tubular shaft 60, 62, 64 and 66 and an inner shaft 68, 70, 72 and 74 within the tubular shaft.

Four clutch means 76, 78, 80 and 82 are mounted one at one end of each of the layshafts 50, 52, 54 and 56, all four clutch means being located within housing 44 at the front end 84 of gearbox housing 44, remote from engine 20 and fluid flywheel 24. Each of the clutch means is operable to establish and interrupt the transmission of drive between the inner and outer shafts of its respective layshaft.

A first group of gears 86, 88, 90 and 92, (forming layshaft change speed outputs gears) is provided, one gear on the inner shaft 68, 70, 72 and 74 of each layshaft. Likewise, a second group of four gears 94, 96, 98 and 100, (forming layshaft change speed input gears) is provided, one gear on the outer shaft 60, 62, 64 and 66 of each of the layshafts.

FIG. 6 is a section through gearbox 22 and therefore shows only two of the clutch means 76 to 82 and two of the layshafts and their associated gears. FIG. 8 represents diagrammatically the entire gearbox. In FIG. 8, where meshing gears cannot be shown in mesh, a dotted line indicates the meshing connection.

As shown in FIG. 6A the axes 51, 53, 57 and 55 of layshafts 50, 52, 54 and 56 are arranged symmetrically around input shaft axis 58 so as to be equi-distant therefrom.

An input shaft gear 102 is mounted on the drive input shaft 46 and meshes with the four gears 94, 96, 98 and 100 on the outer tubular shafts of the four layshafts. Likewise, and output shaft gear 104 is mounted on the drive output shaft 48 and meshes with the four gears 86, 88, 90 and 92 mounted on the inner shafts of the four layshafts. Output shaft 48 is tubular in form and input shaft 46 extends through it in parallel and coaxial relationship. The output gear 104 is in the form of a cluster of four gears 106, 108, 110 and 112 of differing diameters and providing four spaced drive transmission ratios.

In FIG. 8, four dotted lines 114, 116, 118 and 120 indicate the meshing engagement between respectively, gears 94 and 102, 102 and 100, 86 and 108, 106 and 92. Thus each gear of the output cluster 104 meshes with its own gear of the four layshaft gears 86, 88, 90 and 92.

Drive input to gearbox 22 is through fluid flywheel 24 which is directly coupled by a shaft 122 to the flywheel of engine 20. Shaft 122 drives the torus cover 124 of the flywheel, and the output member 126 thereof is connected to the input shaft 46 of gearbox 22.

Drive output from gearbox 22 is through propeller shaft 28 which is coupled to the central drive output shaft 48 of gearbox 22 through a secondary output shaft 128 carrying a secondary output gear 130 meshing with one 92, of the layshaft output gears. The particular layshaft output gear chosen for this purpose is preferably the one providing the highest or next to highest transmission ratio, since these ratios are used more than the others in city buses. The number of torque-transmitting mesh points in this gearbox when clutch 82 is engaged is only two—which promotes fuel efficiency.

Clutch means 76 to 82 each comprise an assembly of interleaved drive input and drive output annular clutch friction elements 134. The outer friction elements are secured to an outer carrier 136 which is fast with the respective outer tubular shaft of the layshaft. The inner friction elements are secured to an inner carrier 138 fast with the inner shaft of the layshaft. The clutch elements are keyed to their carriers by dogs (not shown) for axial sliding movement under the action of a pneumatic pressure-operated thrust device comprising a piston 140 whereby compression is applied to the assembly of clutch elements. Further details of the assembly are described below in relation to FIG. 10.

Control means 144 shown in FIG. 1 is connected to clutch means 76 to 82 of gearbox 22 and is operable to change the ratio of the drive provided by transmission 21. Control means 144 comprises manually operable control elements located in the region of the driver's position at the forward end of the vehicle, having regard to direction F, for actuation by the driver, and signalling means extending from the control elements to gearbox 22. The control elements include a selector switch 146, a brake monitoring device 148 mounted adjacent the brake pedal 150 and a throttle monitoring device 152 mounted adjacent the throttle pedal (not shown).

A road speed monitoring device 154 is mounted on gearbox 22 and is in the form of a magnetic pick-up having a monitoring head mounted closely adjacent one of the drive output gears (for example gear 92) which rotates at a rate proportional to vehicle speed.

The electrical outputs of monitoring devices 148, 152 and 154 are transmitted by respective electrical conductors 156, 158 and 160 to a control unit 162. Selector switch 146 is likewise connected to control unit 162 by a conductor 164.

Control unit 162 comprises electronic control circuits monitoring vehicle speed, throttle setting, and brake actuation. The control unit is responsive to such monitored operational parameters so as to actuate the clutch means of gearbox 22 so as to change the ratio of the drive provided by transmission 21 in accordance with the relevant setting of selector switch 146 by the driver.

The electrical output signal from control unit 162 is transmitted by a conductor 166 to an electro-pneumatic valve 168 mounted adjacent diesel engine 20. The electro-pneumatic valve comprises solenoid-operated valves, controlling the supply of pneumatic pressure from a compressor driven by engine 20, to the pistons 140 of the clutch means 76 to 82, to effect drive engagement. Pneumatic lines 170, 172, 174 and 176 supply pneumatic pressure to the clutch means from the electro-pneumatic valve.

Selector switch 146 has selectable positions for engine starting, reverse gear engagement, and forward gear engagement with automatic ratio changing. Additional positions may also be provided.

In the start position of selector switch 146, all four clutch means of gearbox 22 are of course disengaged. In the reverse position, the control unit causes the electro-pneumatic valve 168 to actuate a pneumatic cylinder (not shown) which engages a simple reverse drive. For example, the pneumatic cylinder may actuate by means of a fork, a gear which is splined to one of the tubular outer layshafts. The fork moves this gear into driving engagement with a gear on an additional layshaft having a reverse gear meshing with one of the gears of the drive output cluster.

When selector switch 146 is in its automatic position, impulses received from monitoring device 154 are fed into the control unit 162 and converted to a direct current voltage which is proportional to road speed. When predetermined voltages are reached, the control unit generates a signal causing electro-pneumatic valve 168 to disengage one of the clutch means and engage another to change the drive transmission ratio.

Ratio changes are modified in accordance with the throttle setting by virtue of signals received from throttle monitoring device 152. Ratio changes in an upward direction (to a higher ratio as vehicle speed increases) occur at fixed vehicle speeds for all throttle positions, whereas ratio although changes in the downward direction also occur at fixed speeds while the throttle is open, when the throttle is closed the ratio already selected is held until a very low road speed is achieved.

For manual selection of transmission ratio, the monitoring devices, selector switch and control unit are replaced by a manually operable switch device controlling the electro-pneumatic valve.

In use of the bus 10, drive is transmitted from engine 20 to the rear road wheels 16 and 18 through fluid flywheel 24 and gearbox 22, which are mounted directly on the engine, and through drive train 26, the ratio of the transmission being determined by control means 144 as described above. If, for example, clutch 76 is engaged, then the vehicle is in third gear and the path of the torque through the gearbox is from drive input shaft 46, through input gear 102 to outer layshaft gear 94, through the clutch elements of clutch means 76 and through its inner layshaft 68, gears 86, 108, 106, 92 and 130 and hence via secondary output shaft 128 to drive train 26. If fourth gear clutch means 82 is pressurized, the torque path from the clutch means is through its inner layshaft 74 and the gear 92 thereof directly to secondary output gear 130 without passing through output gear cluster 104 at all.

The above-described sequential automatic engagement of gears represents the basic function of the drive transmission. In addition, control means 144 is constructed and programmed so as to provide three important additional and related functions which will be referred to as power-upshift and idling drag and retardation.

Power-upshift is provided by control unit 162 being programmed so that, at least when the vehicle is accelerating during use of the sequence of drive transmission ratios, during ratio changing the clutch means of the next higher transmission ratio begins to be engaged before the clutch means of the preceding ratio is entirely disengaged. The total ratio change time is of the order of 0.6 seconds, and thus the period of ratio overlap is a small fraction of a second, but nevertheless makes an important contribution towards effecting ratio change smoothly and without interrupting acceleration.

The idling drag function is provided by the control unit 162 by programming the latter so as to provide for a setting at which the clutch means associated with the drive transmission ratio of the gearbox which is used for starting the vehicle from rest (first gear), is slightly engaged in order to provide a small amount of forward drive to the driven wheels of the vehicle when the engine is idling, whereby roll-back of the vehicle is inhibited. This function is operative when the vehicle is stationary and in first gear prior to moving off after passengers have entered, for example. The small amount of forward drive to the driven wheels prevents vehicle roll-back when the driver transfers his foot from the brake pedal to the throttle (a feature which drivers require) but the resistance to engine rotation (and therefore fuel consumption) is much less than if the first gear clutch means were fully engaged. It is usual practice in vehicles with automatic epicyclic transmissions for the first gear ratio to be fully engaged in this situation—whereby the idling consumption of the engine is increased by a factor of about three. Partial engagement of gearbox ratios in an epicyclic gearbox is usually not possible due to the servo action of the brake bands.

The idling drag function is automatically brought into action when bus 10 is stationary and selector switch 146 is in its automatic transmission position.

The vehicle retarder function incorporated in control unit 162 comprises means for progressively engaging at least one and preferably at least two of the four clutch means of gearbox 22, in addition to the clutch means engaged for driving purposes at any given time.

In the present embodiment, control unit 162 is programmed so that when the vehicle 10 is in third or fourth gear (the ratios used for the majority of travel) retardation is effected by partial engagement of both of the clutch means for the first and second ratios (the ratios used for starting from rest and low speed travel).

The retarder function is controlled by the brake monitoring device 148 which sends a signal through conductor 156 to control unit 162 which then causes electro-pneumatic valve 168 to supply pneumatic pressure to the pneumatic cylinders of the two additional clutch means which are to be partially engaged. The arrangement of monitoring device 148 in relation to brake pedal 150 is such that initial movement of the pedal to cause retardation of the vehicle activates the retarder before significant engagement of the wheel brakes themselves—whereby moderate retardation of the vehicle is achieved by the retarder alone and the wheel brakes are applied only if more rapid retardation is required. A cut-out is incorporated in control unit 162 which renders the retarder inoperative when either of the low speed transmission ratio clutch means 78 and 80 is engaged for driving purposes. Thus the retarder is operative only in third and fourth gears of the bus.

FIG. 8 also shows modifications to the drive input and drive output arrangements of gearbox 22. These modifications are shown in dotted lines. A laterally extending auxiliary input shaft 180 has a bevel gear 182 meshing with a corresponding bevel gear 184 mounted on gearbox input shaft 46 between output gear 104 and input gear 102. Shaft 180 would be connected to engine 20 as described above.

A corresponding modification to the drive output provides an output bevel gear 186 on secondary output shaft 128 meshing with a corresponding output bevel gear 188 on a tertiary output shaft 190. This facility to provide an output shaft at any desired angle is of particular use in adapting the gearbox to differing engine and transmission layouts as will be described.

Figure 2:
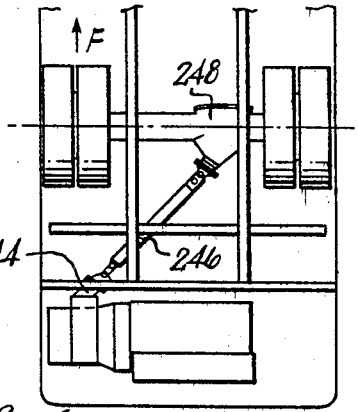
FIG. 2 is a diagrammatic plan view of an alternative engine and transmission arrangement for a city bus showing only the rear portion of the chassis thereof.

FIG. 2 shows the gear portion of a city bus chassis 200 having an engine 202 mounted with its crankshaft extending in direction F. The drive transmission from the engine to the rear wheels 204 comprises a fluid flywheel (not shown), a primary propeller shaft 206 with associated universal joints 208, 210, a gearbox 212 remotely mounted on the frame 214 of chassis 200, and a secondary propeller shaft 216 having universal joints 218, 220 connected to the forwardly-facing drive input connection of a differential drive unit 222. Gearbox 212 is constructed and arranged as described above in connection with FIGS. 6 and 8, with the single modification that the drive output shaft 128 is arranged to extend towards the gearbox drive input connection instead of away from it.

FIG. 3 shows a city bus chassis 224 having a frame 226 with a sub-frame 228 for an engine 230 mounted with its crankshaft extending transverse to direction F. The arrangement is otherwise similar to that of FIG. 1, with fluid flywheel 232 and gearbox 234 directly mounted on the engine at one end thereof, but due to the lateral attitude of the engine a bevel drive output 236 as shown in FIG. 8 (items 186 to 190) is provided. The drive from output 236 to the differential drive unit 238 is through a propeller shaft 240, somewhat longer than shaft 28 in FIG. 1A but otherwise similarly arranged.

Figure 4:
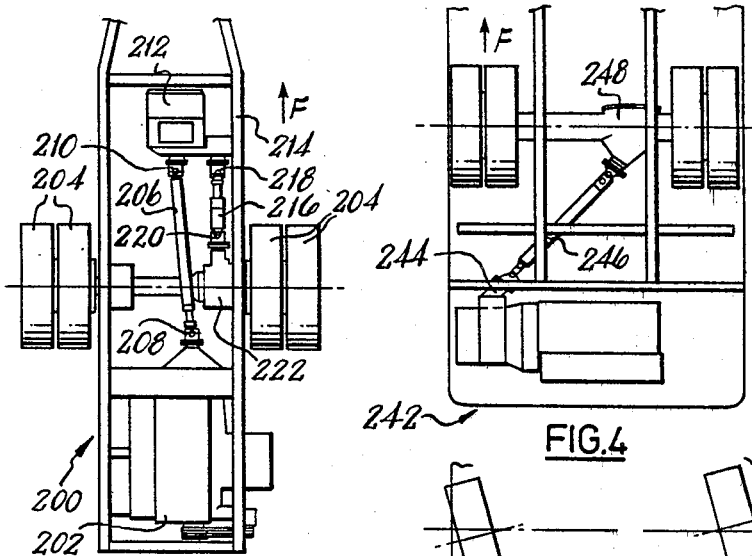
FIGS. 3 and 4 are two further diagrammatic plan views similar to FIG. 2, showing alternative rear engine transmission layouts for city buses.

FIG. 4 shows a further city bus chassis 242 otherwise similar to chassis 224, but having a modified bevel drive output 244 having appropriate bevel gears to provide a 45° attitude (with respect to direction F) for the propeller shaft 246 transmitting drive to differential drive unit 248.

Figure 5:
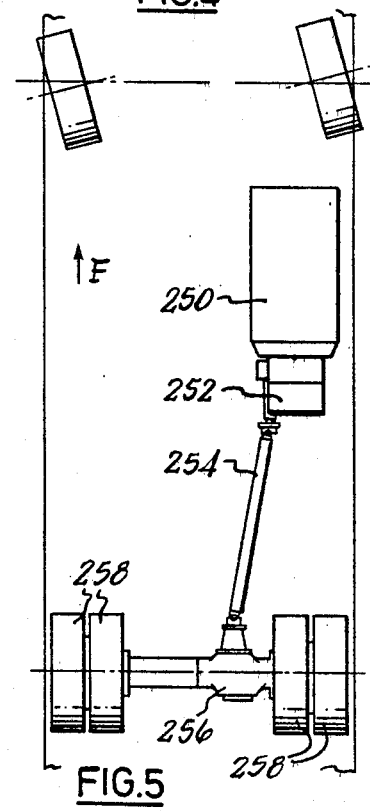
FIG. 5 is a view similar to that of FIG. 1 for a city bus with a mid-mounted engine.

FIG. 5 shows a further alternative city bus chassis layout having a mid-mounted engine 250 with a gearbox 252 mounted directly thereon and transmitting drive through a propeller shaft 254 to a differential drive unit 256 and hence to rear wheels 258.

Gearbox 252 has the drive output arrangements of FIG. 6. It will be noted from FIG. 5 how readily the gearbox adapts itself to this chassis layout, the lateral offsetting of the drive output from the gearbox minimizing the angle of the propeller shaft with respect to direction F and thereby avoiding the need for a special angled input for the differential drive unit 256.

FIG. 7 shows, diagrammatically, a bevel drive output arrangement of the kind indicated in FIG. 8 (items 186 and 188) and employed in the bus chassis of FIG. 3. The gearbox 260 is otherwise similar to gearbox 22 of FIG. 6, but has a secondary output shaft 262 having a bevel gear 264 meshing with a bevel gear 266 on a tertiary output shaft 268 having a drive output plate 270.

Figure 9:
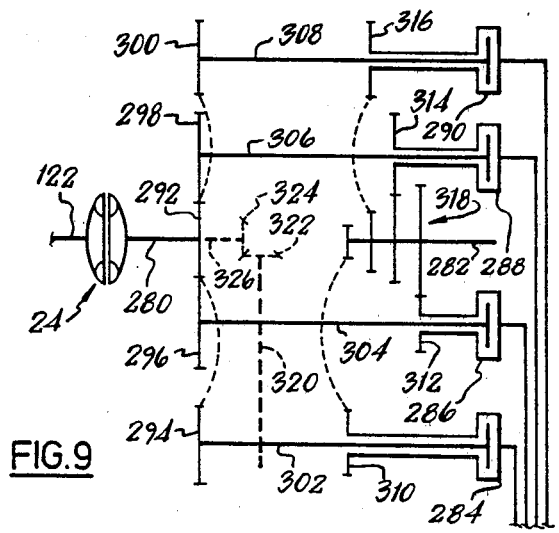
FIG. 9 shows, in a view similar to that of FIG. 8, the gearbox of FIG. 7 with modifications to the drive input and drive output arrangements.

FIG. 9 shows an alternative gearbox layout. Features identical to those of FIG. 8 are given the same reference numerals as in that Figure.

Drive input shaft 280 is coaxial with drive output shaft 282, but arranged end to end with shaft 282 rather than within it. The drive output from the gearbox is transmitted through the end wall (not shown) at the center between the four clutch means 284, 286, 288 and 290.

The drive input shaft gear 292 is mounted at the input shaft end of the gearbox and meshes with the four layshaft input gears 294, 296, 298 and 300 which are mounted on the inner shafts 302, 304, 306 and 308 of the four layshafts.

The layshaft output gears 310, 312, 314 and 316 mesh each with its own gear of the output shaft gear cluster 318 which is mounted on the output shaft 282.

FIG. 9 also shows a modified drive input arrangement with a side input shaft 320, bevel gears 322 and 324, and an internal drive input shaft 326 carrying input shaft gear 292.

This embodiment operates in substantially the same manner as the embodiment of FIG. 8 and no further description is deemed necessary.

Figure 11:
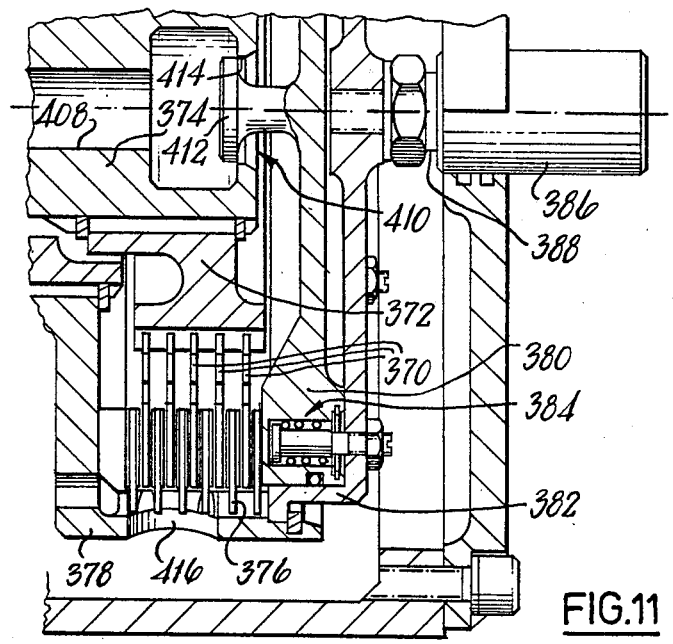
FIG. 11 shows, on a larger scale, details of clutch means and a control valve for a liquid coolant circuit for the clutch means, forming part of the gearbox of FIG. 10.
Figure 12:
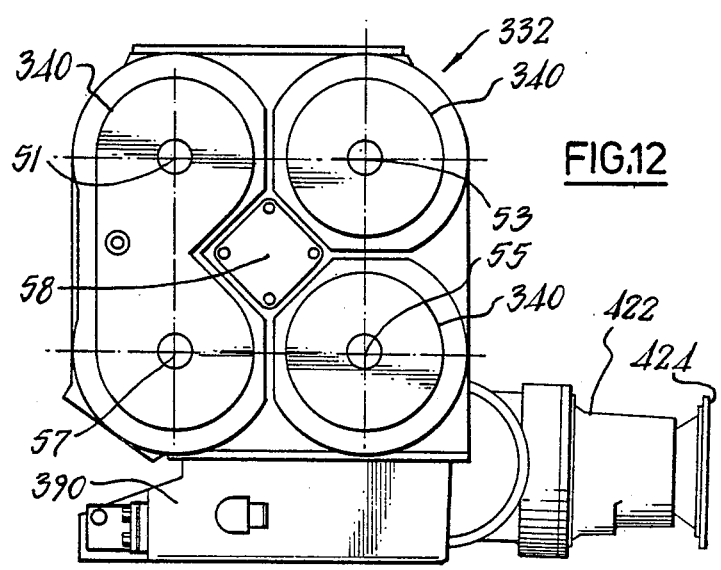
FIG. 12 is a rear end elevation view of the gearbox of FIG. 10, the direction of viewing being indicated by arrow XII therein.

FIGS. 10, 11 and 12 are detailed assembly drawings of a gearbox substantially as described above in relation to FIGS. 6 to 8. In FIGS. 10 to 12 parts corresponding to those of FIGS. 6 to 8 are given the same reference numerals as they have in FIGS. 6 to 8. Layshaft output gear 92 for top gear (highest vehicle speed) meshes with output shaft gear cluster 104 and also with an output gear 330 on secondary output shaft 262. The bevel gear output arrangement of this gearbox is suitable for the bus layout of FIG. 3.

The gearbox 332 of FIG. 10 comprises a housing having two principal parts 334 and 336 secured to the fluid flywheel housing 338 which is itself bolted to the diesel engine (not shown). Housing portion 336 has four removable end covers 340 providing access to the four clutch means 76 to 82.

Layshafts 50 to 56 are journalled in bearings supported by end walls 342, 344 and 346 of housing portions 334 and 336. The outer tubular portion of each layshaft is supported on bearings 348 and 350, and the inner shaft of each layshaft is supported on bearings 352 and 354. Input shaft 46 is journalled on bearings 356, 358. Output cluster gear 104 is journalled on bearings 360 and 362. It will be noted that all shafts are relatively short and well supported.

FIG. 11 shows details of the mounting of the friction elements of the clutch means 76 to 82. The inner clutch elements 370 are splined to a drive input collar 372 on their respective layshafts 374. The outer friction elements 376 are splined to the inner surface of their clutch housing 378. Compression is applied to the assembly of friction elements by a pneumatic piston 380 slidably mounted in a cylinder 382 having a spring return device 384. Pneumatic pressure is supplied to cylinder 382 through a union 386 having internal carbon face type seals (not shown) in which an inlet tube 388 which rotates with cylinder 382 is an airtight fit.

Lubricant for the gearbox is contained in a sump 390 and in the bevel gear output housing 392. Circulation of lubricant is as follows. A lubricant pump is driven by a gear 394 meshing with one of the layshaft input gears. Lubricant is drawn from the sump and passed through a filter 396 and passes via a conduit 398 to a heat exchanger 400 and thence via a conduit 402 to a manifold 404 at the drive input side of gearbox 332. Manifold 404 extends across the gearbox between the layshafts 374 (corresponding to layshafts 70 and 72) providing the lowest drive ratios (lowest vehicle speeds).

Layshafts 374 are each formed with an internal bore 408 communicating with manifold 404 and extending the length of the layshaft to a control valve 410. The two control valves 410 control the supply of oil to the two clutch means of layshafts 374 and are operable to establish and interrupt the supply of coolant oil to the clutch elements whereby the flow of coolant oil is varied according to the usage of the clutch means.

Each control valve 410 comprises a central valve member 412 integral with piston 380, and a cooperating valve opening 414 formed at the end of the layshaft 374. Valve member 412 is freely rotatable relative to opening 414 even when the valve is closed. FIG. 11 shows the valve in its closed position. Pressurization of pneumatic cylinder 382 moves valve member 412 away from opening 414 to open the valve and permit oil to pass from bore 408 through the valve, whereupon it is thrown outwardly to friction elements 370, 376. The interengaging faces of the clutch friction elements are formed with a criss-cross pattern of oil channels (not shown) for the outward passage of oil, which carries away heat generated in between the friction elements and passes through openings 416 in housings 378 and hence passes back to the sump 390.

Control valves 410 provide a high volume flow of oil over the two sets of clutch friction elements used for retardation purposes. The two other sets of clutch friction elements are provided with a constant lower volume of oil by means of a conduit (not shown) and an associated restrictor delivering oil from manifold 404 to the other two layshafts, which are constructed in the same manner as layshafts 374, but without an end control valve.

Heat exchanger 400 provides for heat exchange between the gearbox oil and the liquid coolant for diesel engine 20. The latter fluid is passed through an inlet 418 and an outlet 420, between which it absorbs heat from a spiral conduit through which the oil passes.

FIG. 12 shows the housing 422 of the bevel drive output, together with the drive output plate 424 to which the propeller shaft 240 (FIG. 3) is coupled.

FIG. 14 shows a modified gearbox layout. An axiliary drive input shaft 430 drives an input shaft 432 through bevel gears 434, 436. The main input gear 438 (corresponding to gear 102) drives the four input layshaft gears 440 (which are mounted on the outer tubular layshaft portions 442) in the same manner as in the previous embodiments.

The layshaft inner shafts 444 carry respective layshaft output gears 446 which mesh with an output shaft gear cluster 448 connected to a final drive output shaft 450 extending through the end of the gearbox.

Layshafts 444 have bores 452 corresponding to bores 408. Output shaft gear cluster 448 is journalled in a bearing 454 supported on an extension 456 of input shaft 432. Other parts are either as described above or analogous thereto, or the structure is fully apparent from FIG. 14.

FIG. 13 shows gearbox 332 arranged alongside an epicyclic gearbox 502 which is currently available for use in the drive transmission of city buses. For use in the bus layout of FIG. 3 the relationship between the gearbox drive input shaft 504 and the drive output flange 506 must have the spacial relationship shown. For epicyclic gearbox 502 a train of gears in a housing 508 is required together with a shaft drive in a housing 510 and a bevel gearbox 512.

The simplicity and economy of the drive output arrangements of the gearbox 332 are immediately apparent from FIG. 13 taken together with the above description of the structure of gearbox 332. This advantage arises principally from the flexibility of gearbox 332 for adaptation of other drive output arrangements. Epicyclic gearboxes require drive input and output from the ends of the gearbox. Other advantages provided by the above embodiment are set out below.

Among the principal advantages provided by the embodiment are the simplicity of the transmission, and the consequential ease of production, maintenance and overhaul. The gear trains are straightforward in design, present no new technical problems in design or production and can be built to give extremely long life under bus operating conditions. The short layshafts in the gearbox are inherently stiff and avoid the need for spherical layshaft end bearings.

As regards servicing the drive transmission, the major wearing components of the transmission are the clutch elements which are accessible through the removable end covers the gearbox. Each clutch means can be serviced by removing the clutch elements as a pack by sliding them off their splines, and by sliding back on a service set of clutch elements. The time taken for replacement of these components is reduced by a factor of from ten to twenty. Also, the air-operated clutches require no setting up or service adjustment during their working life so the quality of gear change can be maintained over large mileages.

Concerning fuel efficiency, the transmission has low churning energy losses (due to the basic gearbox design and gear ratios and reduction of loaded gear mesh points), low oil pump losses (due to the avoidance of the use of a torque converter which requires a high pressure oil pump), reduced transmission drag when idling (due to idling with only partial engagement of first gear), elimination of coupling slip (due to the use of a fluid coupling instead of a torque converter), use of gear ratios to suit operating conditions (due to the ease of building the gearbox with various gear ratios), and use of pneumatically actuated clutches instead of hydraulic clutches (which eliminates the need for high pressure oil pumps). The simplicity of the gearbox reduces its cost and enables four ratios to be provided at modest cost, whereas in the past three ratio epicyclic gearboxes have been used in combination with torque converters (which are inefficient) to spread the gear ratios.

As regards retardation, the transmission provides a simple and efficient retarder which gives constant retarding torque down to zero vehicle speed whereby the problem of matching front to rear braking effort is greatly simplified as compared with hydraulic or electric retarders where the retard force varies considerably with road speed—especially in the range from 50 kilometers per hour to rest. Electric and hydraulic retarders have very little effect at all below 25 kilometers per hour. The retarder function is provided at minimal original manufacturing cost.

In addition, the transmission provides for automatic ratio changing with power up-shift, which is considered essential for modern city bus usage. The other main advantage of the described embodiments relates to its adaptability to varying vehicle layouts which has already been fully discussed. The adaptability of the transmission allows the use of propeller shafts and universal joints in the drive trains of rear-engined buses while retaining standard rear overhang of the bus. Other transmissions require a lengthened overhang.

Modifications which can be made in the above embodiments while remaining within the scope of the invention include the following. Only two or only three layshafts (each with its own clutch means) need be provided, if desired. For vehicle drive purposes the two-layshaft box may be provided with a clutch-controlled straight through top gear providing no reduction and thereby giving three ratios. Such a gearbox may be employed with a torque converter drive input to spread the ratios. The three layshaft gearbox may likewise be provided with a straight through top gear.

Drive input to the gearbox may be a mere mechanical connection so that the first gear clutch means is used for drive take-up. The clutch means are well able to stand such usage.

The clutch means may employ other forms of clutch including hydraulic torque transmitting devices as well as alternative mechanical clutches. Control of the clutches may be effected hydraulically or even mechanically.

The input and output shafts need not be coaxial, and the layshafts need not be on a common pitch circle centered on the output shaft.

We claim:

1. In a highway vehicle as defined herein comprising ground wheels, a prime mover, and a drive train connecting the prime mover to the ground wheels, a gearbox forming part of said drive train and comprising:
   an input shaft;
   an output shaft;
   an input shaft gear on the input shaft;
   an output shaft gear on the output shaft;
   at least two layshafts having corresponding constant mesh layshaft gears;
   clutch means for each of said layshafts for selective transmission of drive through the layshafts; and
   a gearbox housing;
   said layshaft gears comprising layshaft change speed input gears and layshaft output gears with one layshaft input gear and one layshaft output gear for each layshaft;
   the layshaft input gear of each of said layshafts meshing directly with said input shaft gear and the layshaft output gear of each of said layshafts meshing directly with said output shaft gear;
   one layshaft and its corresponding clutch means and layshaft gears being provided for each layshaft-transmitted transmission ratio of the gearbox, and said clutch means being located within said housing at one end thereof and at the ends of the layshafts, the clutch means each comprising an assembly of interleaved clutch plates whereby automatic or semi-automatic power shifting between the ratios provided by said gearbox can be provided;
   liquid coolant supply means to supply liquid coolant to said clutch means and coolant control means being provided to control the supply of liquid coolant to said clutch means whereby in use the flow of coolant to at least one of said clutch means may be greater than the flow to another thereof according to the usage of the clutch means, said one of said clutch means being associated with a layshaft providing a lower transmission ratio for lower output shaft speed than said other of said clutch means; and
   clutch control means operable to cause at least one of said clutch means to be partially engaged in addition to the clutch means engaged for driving purposes at a given time, to provide a vehicle retarder.

2. In a highway vehicle, the gearbox of claim 1 wherein said clutch control means is operable to partially engage clutch means of two lower transmission ratios in addition to said clutch means engaged for driving purposes, and said coolant control means being operable to control the supply of liquid coolant to both said clutch means whereby in use the flow of coolant to said two clutch means may be greater than the flow to another thereof during retardation of the vehicle.

3. In a highway vehicle, the gearbox of claim 2 wherein said two clutch means each comprise a thrust device operable to apply compression to said assembly of interleaved clutch members, said thrust device being directly connected to a valve member of a control valve for controlling the flow of the coolant, so that the control valve opens when compression is applied to said assembly.

4. In a highway vehicle, the gearbox of claim 3 wherein said coolant control means comprises minimum flow rate means to provide a minimum rate of flow of coolant to said clutch means during use.

5. In a highway vehicle, the gearbox of claim 4 wherein each of said layshafts is formed with a coolant supply bore extending lengthwise of the layshaft to said coolant control means.

6. In a highway vehicle, the gearbox of claim 5 wherein inlet means for said liquid coolant is provided at one end of the gearbox and communicating with at least one of said coolant supply bores in the layshafts, said control valve being located at the other end of said coolant supply bore in said layshaft and adjacent the clutch means of that layshaft, the control valve comprising a valve member mounted on a clutch actuating piston and cooperating with a valve seat formed at said end of the coolant supply bore.

7. In a highway vehicle, the gear box of claim 1 wherein said input shaft receives an input drive from an auxiliary input shaft through a bevel or similar gear drive.

8. In a highway vehicle, the gearbox of claim 1 wherein said layshafts each comprise an outer tubular shaft and an inner shaft within the outer tubular shaft, said layshaft input gears being mounted on said layshaft outer shafts, said layshaft output gears being mounted on said layshaft inner shafts, said clutch means of each layshaft comprising two sets of interleaved annular clutch elements, said sets being connected to the layshafts respectively at their inner and outer peripheries for drive transmission purposes, and each layshaft input gear being directly connected through a clutch housing to its set of clutch elements which are connected to the layshaft at their outer peripheries.

9. In a highway vehicle, the gearbox of claim 8 wherein said output shaft comprises a tubular shaft carrying said output shaft gear and said input shaft is arranged coaxially with the output shaft and extends through the tubular output shaft.

10. In a highway vehicle, the gearbox of claim 1 wherein said layshafts are journalled in bearings carried by said gearbox housing independently of a cover means whereby said cover means are removable or openable without moving any of said bearings.

11. In a highway vehicle, the gearbox of claim 1 wherein said drive output shaft is connectable to a drive train through a secondary output shaft carrying a secondary output gear meshing with one of said layshaft output gears.

12. In a highway vehicle, the gearbox of claim 11 wherein said one of the layshaft output gears is mounted on the layshaft which provides the highest layshaft-transmitted transmission ratio of the gear train for high output shaft speed or the highest said transmission ratio but one.

13. In a highway vehicle, the gearbox of claim 1 in combination with further control means connected to the clutch means and operable to change the ratio of the drive provided by the gear train, said further control means being operative to provide automatic selection of drive transmission ratios in accordance with monitored operational parameters of a drive transmission incorporating the gear train, during use.

14. In a highway vehicle, the gearbox of claim 13 wherein said further control means is operative to engage said drive transmission ratios in sequence so that, at least when the vehicle is accelerating during use of said sequence of ratios, the clutch means of the next higher ratio begins to be engaged before the clutch means of the preceding ratio is entirely disengaged.

15. In a highway vehicle, the gearbox of claim 14 wherein said further control means is operable to cause the clutch means associated with the drive transmission ratio of the gear train which is used for starting a vehicle from rest to be partially engaged in order to provide a small amount of forward drive to the driven wheels of such vehicle when the prime mover thereof is idling, whereby roll-back of such vehicle is inhibited.

16. In a highway vehicle, the gearbox of claim 1 wherein said gearbox is mounted on said prime mover with all of the clutch means of said layshafts located at the end of the gearbox remote from the prime mover.

17. In a highway vehicle, the gearbox of claim 1 including a circulation circuit for said liquid coolant comprising a liquid to liquid heat exchanger whereby heat from said clutch means can be transferred to a liquid coolant for said prime mover.

* * * * *